Jan. 20, 1970 C. W. E. WALKER 3,491,291

RESONANT LOOP SINGLE CONDUCTOR SURFACE WAVE DEVICE

Original Filed Aug. 8, 1958 3 Sheets-Sheet 1

Inventor

Charles W. E. Walker by Hill, Sherman, Meroni, Gross & Simpson Attys

RESONANT LOOP SINGLE CONDUCTOR SURFACE WAVE DEVICE

Original Filed Aug. 8, 1958 3 Sheets-Sheet 2

Inventor
Charles W. E. Walker by Hill, Sherman, Meroni, Gross & Simpson Attys

RESONANT LOOP SINGLE CONDUCTOR SURFACE WAVE DEVICE

Original Filed Aug. 8, 1958 3 Sheets-Sheet 3

Inventor

Charles W. E. Walker by Hill, Sherman, Meroni, Gross & Simpson Attys

United States Patent Office 3,491,291

Patented Jan. 20, 1970

3,491,291

RESONANT LOOP SINGLE CONDUCTOR SURFACE WAVE DEVICE

Charles W. E. Walker, Beloit, Wis., assignor to Beloit Iron Works, Beloit, Wis., a corporation of Wisconsin Continuation of application Ser. No. 753,987, Aug. 8, 1958. This application June 27, 1966, Ser. No. 560,836

Int. Cl. G01r *27/04*

U.S. Cl. 324—58.5 8 Claims

ABSTRACT OF THE DISCLOSURE

A microwave device comprising a single conductor surface wave line in the form of a closed loop or in the form of a helix with each loop having a length equal to an integral number of wavelengths for resonant operation or a length equal to an odd number of half wavelengths for reflection of surface wave energy. A closely wound resonant helix may be used for moisture sensing. Resonant loop devices may be used as microwave amplifiers or oscillators, for example.

CROSS REFERENCE TO RELATED APPLICATION

The present application is a continuation of my copending application Ser. No. 753,987 filed Aug. 8, 1958, now abandoned.

This invention relates to a microwave apparatus and method and particularly to a single conductor surface wave device.

In accordance with an embodiment of the present invention, a single conductor is formed into a loop or coil and microwave energy is transmitted as a surface wave along the conductor. The length of the loop or of the multiple loops forming a coil is preferably such that the microwave energy which travels about a loop and returns to a point at or adjacent to the entrance point of the loop will have a predetermined phase relation to microwave energy entering the loop; for example the length of the loop may be a whole number of wavelengths so as to give reinforcement. Such loop devices have a wide range of application and may, for example, be used in microwave measurement of the moisture content of a paper web. Since the length of the loop is a whole number of wavelengths for maximum gain, the structure is highly frequency sensitive. The loop surface wave device of the present invention can therefore fulfill the same function as a cavity resonator and can be applied in the design of magnetron or klystron-like oscillators.

Accordingly, it is an important object of the present invention to provide a novel microwave apparatus and method.

Another object of the invention is to provide a single conductor surface wave device of novel construction and operation.

Another and further important object of the invention resides in the provision of means for generating microwave energy directly as a surface wave on the exterior surface of a wave guide.

Another object of the invention is to provide a novel system and method for sensing a constituent of material by means of microwave energy.

Still another object of the invention is to provide a novel wavemeter.

A further object of the invention is to provide a novel oscillator utilizing a loop single conductor surface wave guide.

Yet another object of the invention is to provide a novel attenuator utilizing a surface wave guide of loop configuration.

Yet another and further object of the invention resides in the provision of a novel amplifier for microwave signals.

Other objects, features and advantages of the present invention will be apparent from the following detailed description taken in connection with the accompanying drawings, in which.

Figure 3:
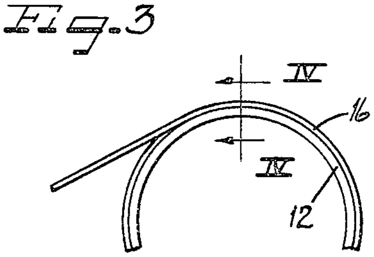
FIGURE 3 illustrates a modified conductor configuration for the device of either FIGURE 1 or FIGURE 2.
Figure 4:
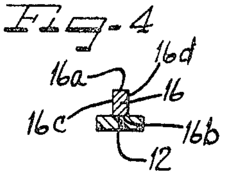
FIGURE 4 is a fragmentary cross sectional view taken generally along the line IV—IV of FIGURE 3.
Figure 4A:
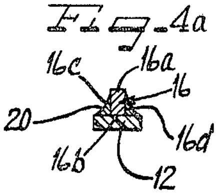
Figure 5:
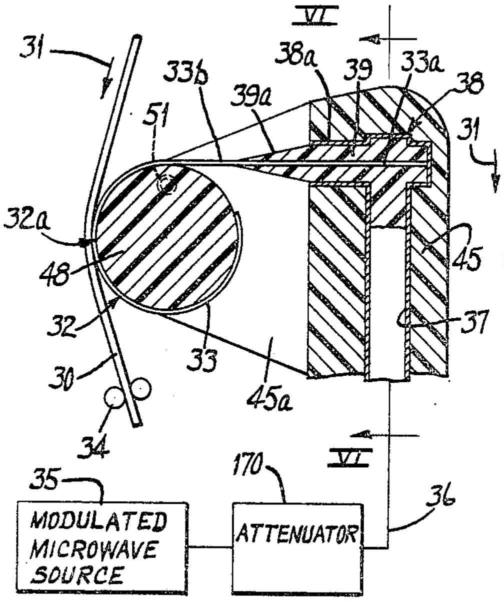
Figure 6:
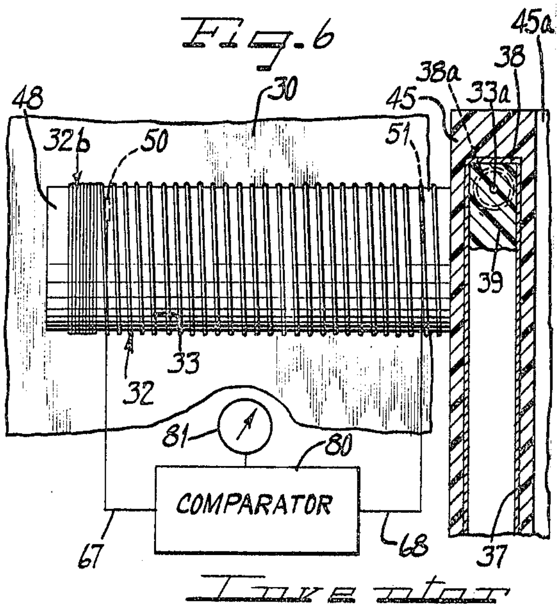
Figure 6A:
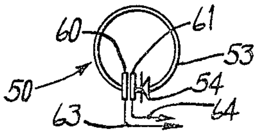
Figure 6B:
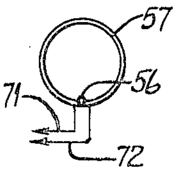
Figure 7:
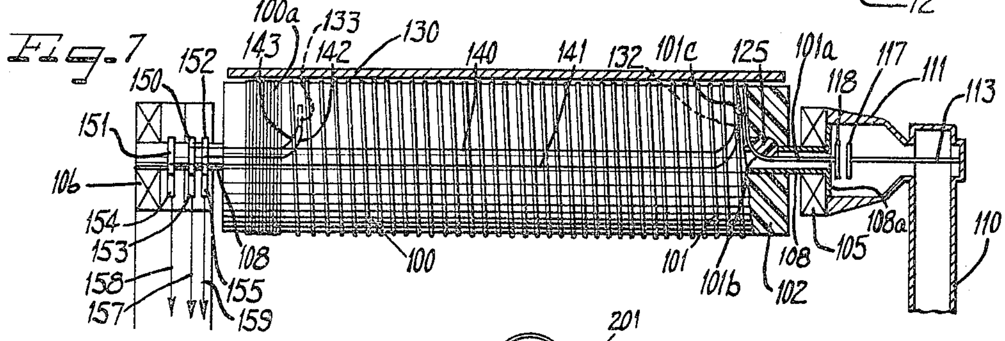
Figure 8:
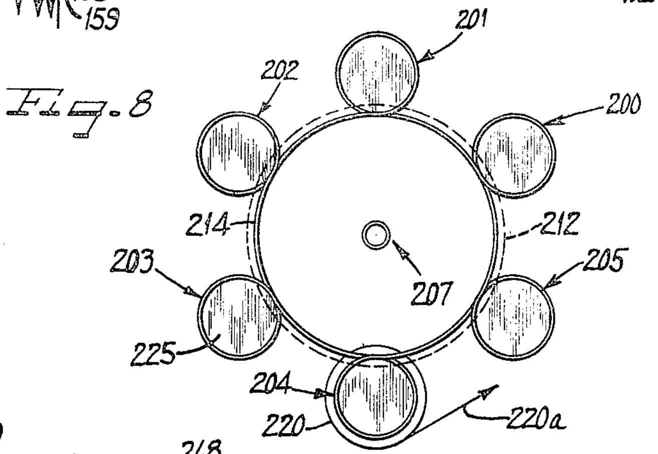
Figure 9:
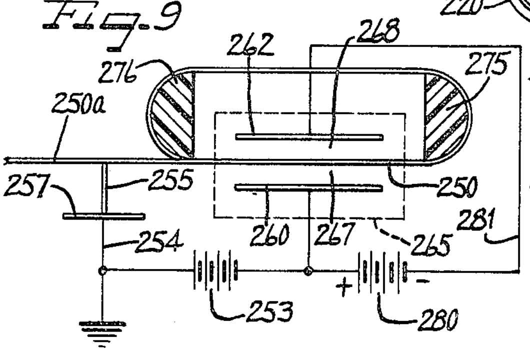
Figure 10:
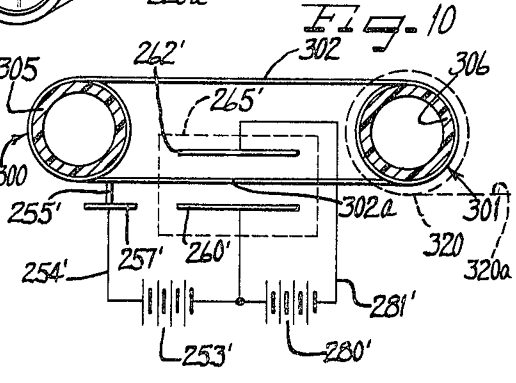
Figure 11:
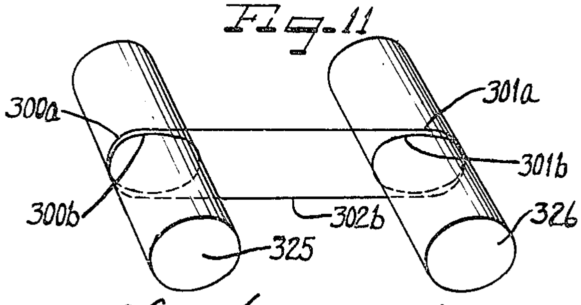
Figures 12, 13, 14:
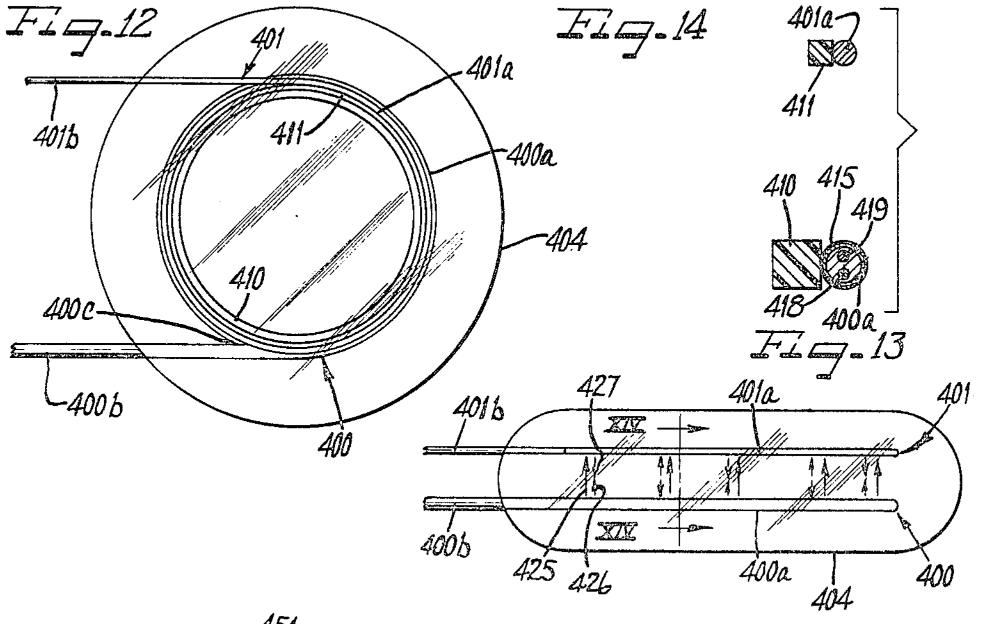
Figure 15:
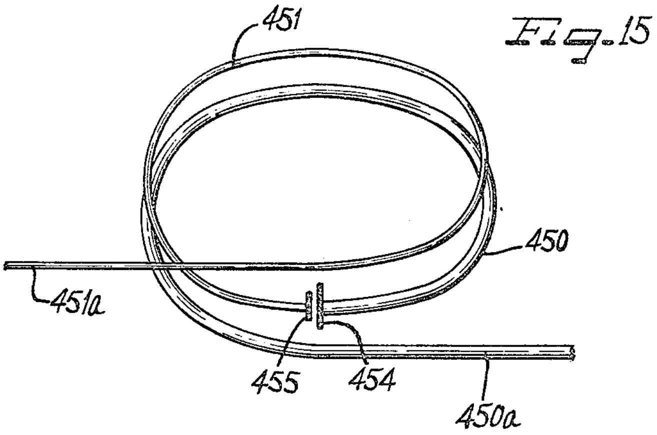
Figure 16:
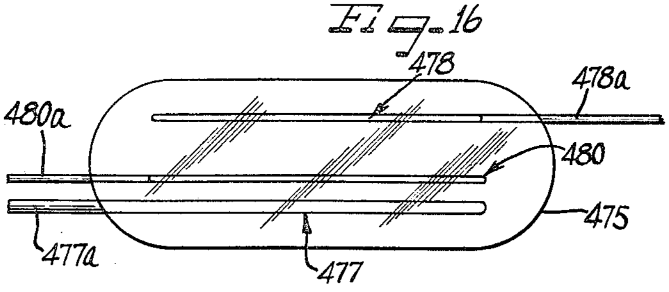

FIGURE 4*a* is a fragmentary cross sectional view similar to FIGURE 4 and illustrating a modification of the embodiment of FIGURE 3 wherein a tapered dielectric coating is applied to the conductor;

FIGURE 5 is a somewhat diagrammatic vertical sectional view illustrating a coil type microwave device utilized for detecting the moisture content in a moving web of paper or the like;

FIGURE 6 is a transverse sectional view taken generally along the line VI—VI of FIGURE 5;

FIGURE 6*a* is a diagrammatic illustration of a first form of signal pickup probe for the embodiment of FIGURE 6;

FIGURE 6*b* is a diagrammatic showing of a second form of signal pickup probe for FIGURE 6;

FIGURE 7 is a somewhat diagrammatic elevational view of a rotating coil type microwave device for sensing moisture content in a paper web, with certain parts shown in section;

FIGURE 8 is a diagrammatic illustration of a series of coil type microwave devices utilized in a magnetron type oscillator;

FIGURE 9 is a diagrammatic illustration of a closed loop type microwave device functioning analogously to the resonant cavity of a reflex klystron;

FIGURE 10 is a diagrammatic illustration of a further embodiment wherein a plurality of resonant loops or coils are utilized in the device similar to that of FIGURE 9;

FIGURE 11 illustrates a modified series of resonant loops formed from a single conductor for use in the embodiment of FIGURE 10;

FIGURE 12 is a somewhat diagrammatic plan view of a microwave amplifier system in accordance with the present invention;

FIGURE 13 is a somewhat diagrammatic side elevational view of the structure of FIGURE 12;

FIGURE 14 is an enlarged fragmentary cross sectional view taken generally along the line XIV—XIV of FIGURE 13;

FIGURE 15 illustrates a modified single conductor surface wave loop device for use in the embodiment of FIGURES 12, 13 and 14; and FIGURE 16 illustrates a modified amplifier system in accordance with the present invention.

As shown on the drawings:

Microwave power guided along an open conductor which follows a curved path suffers appreciable loss probably due to radiation from the conductor. To a first approximation, it appears that the loss in db per unit length of wire is nearly proportional to the inverse of the radius of curvature. There are indications, however, that as the radius of curvature is reduced to the order of one wavelength, the losses increase still more rapidly.

Figure 1:
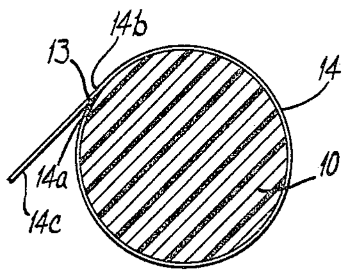
FIGURE 1 is a somewhat diagrammatic illustration of a closed loop microwave device in accordance with the present invention.
Figure 2:
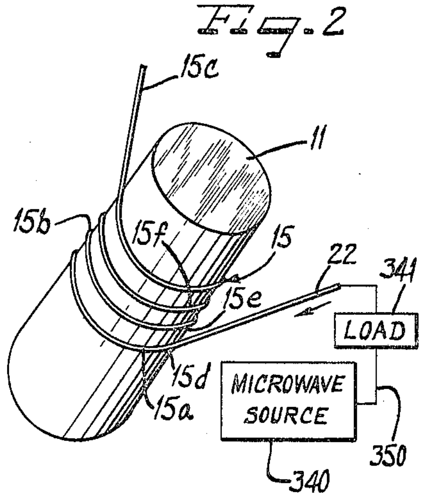
FIGURE 2 is a diagrammatic perspective view of a coil type microwave device in accordance with the present invention.

It has been found that this loss due to curvature can be reduced or even eliminated by adding a dielectric on the inside of the curve, forexample as indicated at 10, 11 nd 12 in FIGURES 1, 2 and 3 respectively. It seems that the dielectric acts with the microwave energy somewhat analogously to glass with light and refracts the wave so that it follows the conductor indicated in the form of a helical coil at 15 in FIGURE 2 and shown at 16 in FIGURE 3. Transmission around a coil, as in FIGURE 2, has been effected virtually without loss.

For lossless transmission, it is essential that the radius of curvature be correctly proportioned to the dielectric constant of the dielectric. With too large a radius of curvature, the wave is refracted off the conductor into the dielectric (as with a dielectric placed on one side only of a straight conductor). With too small a radius of curvature, the refraction is insufficient and some of the wave is radiated outward.

On the inside of the curve, in the dielectric, the wave energy is almost wholly confined to a narrow region close to the conductor. This confinement is due to the dielectric. The distance travelled by the wave in passing around an arc subtending an angle $\theta$ of a circle of radius $r$ is therefore $r\theta$. The speed of the wave in the dielectric is $$c/\sqrt{e}$$

where $e$ is the dielectric constant. Therefore, the time required to traverse the arc $r\theta$ is $$\frac{\theta}{c} r\sqrt{e}$$

On the outside of the curve, in air, the wave energy will spread over a distance from the conductor which may be several wavelengths for a good conductor, uninsulated and with a smooth surface or about half a wavelength if the conductor has appreciable resistance or has a thin dielectric coat or has a roughened or corrugated surface. Except in the first case, that is for a partially confined wave, the mean radius of curvature for the wave in air is approximately $$r+\frac{\lambda}{4}$$

Since $c$ is the speed of the wave energy in air, the time required to traverse the angle $\theta$ is $$\frac{\theta}{c}\left(r+\frac{\lambda}{4}\right)$$

It is found that satisfactory transmission around a curve is obtained if the radius of curvature and the dielectric constant are matched so that the traverse time on the inside and outside of the curve are equal, that is $$\frac{\theta}{c} r\sqrt{e}=\frac{\theta}{c}\left(r+\frac{\lambda}{4}\right)$$

so that $$r\sqrt{e}=r+\frac{\lambda}{4}$$

While this relationship has been found to give a satisfactory result, it does not necessarily give the optimum condition.

Some further improvement in transmission around a curve may be obtained by using a thick conductor as indicated at 16 in FIGURES 3 and 4, so that the wave on the outside surface of the conductor indicated at **16*a* in FIGURE 4 has further to travel than on the inside surface indicated at 16*b*. A tapered dielectric coating may be supplied to the conductor 16 as indicated at 20** in FIGURE 4*a* to match or synchronize the wave travel at all points around the conductor surface including side surface portions **16*c* and 16*d* as well as outer surface portions 16*a* and inner surface portion 16*b***.

A coil, as illustrated in FIGURE 2, may be close or open wound. For a close wound coil where the microwave energy associated with one turn such as indicated at **15*a* is closely coupled with the microwave energy of an adjacent turn such as illustrated at 15*b***, and for a closed loop as in FIGURE 1, the length of the loop or of the multiple loops forming a coil is preferably such that the microwave energy which travels about a loop and returns to a point at or adjacent to the entrance point of the loop will have a predetermined phase relation to microwave energy entering the loop. It is found that the characteristics of a loop for a given microwave frequency are critically related to the length of the loop in relation to the wavelength of the microwave signal. Where the length of the loop is equal to a whole number of wavelengths, the field due to the microwave energy entering the loop will be reinforced by the field of the microwave energy which has traveled about the loop and has returned to or adjacent to the entrance point of the loop. If the length of the loop is an odd multiple of ½ wavelength, the field due to the entering microwave signal will be opposite the field due to the microwave energy which has traveled about the loop so that the loop acts as a reflector of the microwave power.

When the length of the loop is adjusted for reinforcement, if the losses around the loop amount to 10%, then the power circulating in the loop must be 10 times the input power before the losses will balance the input. Loop losses as low as 0.1% should be easily obtainable, giving gains in field strength of 1000 times. Thus if a loop type microwave device adjusted for reinforcement is used to detect moisture in paper, a 1% absorption of microwave energy by moisture in the paper would drop the circulating power in the device by a factor of 10 (i.e. 10 db drop from 1000 times) and a 10% absorption would drop the circulating power to 10 times (or a further 10 db drop).

Since the loop length is a whole number of wavelengths for maximum gain, a loop device in accordance with the present invention can be utilized as a wavemeter. Since the device is highly frequency sensitive, the device can also fulfill the same function as a cavity resonator.

It is found that microwave power can be induced from one coil or closed loop such as indicated in FIGURES 1 and 2 to another coil or closed loop placed in close proximity, and in a similar manner to that commonly practiced at lower frequencies in the audio and radio frequency part of the spectrum but never previously attempted at microwave frequencies. At microwave frequencies there are, of course, the special requirements noted above with respect to the means for preventing radiation loss from the coil and with respect to the proportioning of the length of the loops with respect to the wavelength of the applied microwave energy.

An effective microwave attenuator can be obtained by winding a coil as shown at 15 in FIGURE 2 using resistance wire of a few ohms per inch. As a terminating attenuator, the far end of the coil may be simply left open ended as indicated at **15*c* in FIGURE 2. A terminating attenuator for 22,000 megacycles per second was constructed comprising 10 turns of resistance wire wound on a core of "Teflon" which is a tetrafluoroethylene resin material having a dielectric constant of about 2. The core had a diameter of 1¼ inches and the total resistance of the wire wound on the core was 240 ohms. There was no detectable standing wave on the conductor such as indicated at 22** in FIGURE 2 leading to the attenuator, showing that it was a very effective totally absorbing termination. A similar coil of 7 turns gave 20 db attenuation through the coil.

It is noted that using a material of dielectric constant 6 (for example a suitable ceramic material such as that manufactured under the trade name "Pyroceram"), an effective attenuator for use at 22,000 megacycles per second can be made by winding resistance wire on a dielectric core of about 0.5 centimeter diameter. Such an attenuator closely resembles a common wire wound electronic resistor in both appearance and function, but the similarity is only superficial because the common electronic resistor has no critical relations between its dimensions and wavelength, and its operation is entirely different. For example, the conventional electronic resistor would be inoperative with one end open circuited and would not be provided with surface wave coupling means such as indicated at 118 in FIGURE 7 for connecting the same in a single conductor surface wave transmission line.

For high frequencies and particularly above 100,000 megacycles per second, for which the wavelengths are less than 3 millimeters, a dielectric of small dielectric constant would be desirable. For example, at 200,000 megacycles per second, a "Teflon" core would have to be about 2 millimeters diameter which may be inconveniently small. A suitable material might be obtained by "foaming" a core of "Teflon" so as to produce a material, for example about 30% "Teflon" and 70% air. Such a material could be expected to have a dielectric constant of about 1.3, which at 200,000 megacycles per second would call for a core diameter of about 0.5 centimeters.

A variable attenuator can be obtained by providing a tapered axially shiftable dielectric core in conjunction with a closed loop or coil such as shown in FIGURE 1 or 2. Also, a porous dielectric core could be used in FIGURES 1 and 2 and a variable attenuator obtained by inserting more or less of an absorbing gas or liquid in the porous core. Attenuation can be frequency selective by molecular resonance of the absorbing gas or liquid.

Each of the foregoing modifications is applicable to the embodiments of FIGURES 1 and 2.

FIGURES 5 and 7 illustrate an embodiment of the present invention which may be utilized, for example, to detect the moisture content of a moving web of paper or the like. In FIGURE 5, a web 30 is indicated as travelling in the direction of arrow 31 in close relation to successive turns of a helical coil 32 formed of a conductive member 33 generally similar to the conductor 15 of FIGURE 2 or 16 of FIGURES 3 and 4 or 4*a* under the impetus of drive rolls such as indicated at 34. Microwave energy is diagrammatically indicated as being supplied to the coil 32 from a microwave source 35, for example by means of a hollow rectangular wave guide indicated diagrammatically at 36 and structurally at 37 leading to a wave guide to coaxial coupler 38. An end portion **33*a* of conductor 33 extends axially of coupler 38 as indicated and has a tapering dielectric support as indicated at 39 filling the interior space of the coupler 38 and providing a gradual taper at the exterior of the coupler 38 for the purpose of launching the electromagnetic energy as a surface wave along the open wave guide portion indicated at 33*b***. Any other form of wave guide to coaxial coupler and wave launcher may be substituted for that shown in FIGURES 5 and 6.

The reason for the effectiveness of the tapered dielectric as indicated at **39*a* in launching the surface wave is that the presence of the dielectric causes the energy in the field to be concentrated close to the conductor 33*a* but to spread further from the conductor as the thickness of the dielectric layer is reduced. Thus as the wave leaves the end of the coaxial guide indicated at 38*a* the energy which is at first concentrated close to the central conductor 33*a* will gradually spread out eventually reaching the normal distribution for open wire 33*b***.

In effect the tapered section of dielectric indicated at **39*a* acts to match the wave distribution for the open wire wave guide to the wave distribution for the dielectric filled coaxial guide portion 38*a*, without any sudden discontinuity which could cause reflection of the wave. The dielectric can also be curved to guide the wave around a bend in the open wire by proper proportioning of the thickness and characteristics of dielectric at the inside of the curve as compared to the outside of the curve in accordance with the previous discussion in connection with FIGURES 1 to 4. Thus, the launching may be effected at an angle to the coaxial guide such as indicated at 38*a***. The same configuration can be used for reception of the wave from an open wire guide into a coaxial guide.

In the embodiment of FIGURES 5 and 6, wave guide 37 and launcher 38 are illustrated as being imbedded in a plastic material 45 including an arm **45*a* supporting a dielectric core 48 on which the coil 32 is wound. The core 48 may have pickup probes 50 and 51 imbedded therein in coupling relation to the microwave energy at spaced positions along the coil 32**. As indicated in FIGURE 6*a*, the probes may each comprise a wire conductive loop 53 having a crystal detector as indicated diagrammatically at 54 for providing an audio frequency signal, assuming that the microwave energy is modulated at the audio rate at microwave source 35. The probes, being located within the coil 32, are shielded from stray fields. Instead of the crystal detector 54, a thermistor bead 56 may be inserted in a wire loop 57 to generate a direct current signal in the form of varying direct current resistance of the bead 56. In FIGURE 6*a*, the output may be taken across capacitor plates 60 and 61 which provide a low impedance at the microwave signal frequency but a relatively high impedance at the audio modulation rate. The electrical leads connecting with the plates 60 and 61 are designated 63 and 64 in FIGURE 6*a* and are represented by line 67 in FIGURE 6. Electrical leads 71 and 72 are shown connecting the opposite sides of thermistor bead 56 in FIGURE 6*b*. Probes 50 and 51 are illustrated in FIGURE 6 as being connected to a comparator 80 by means of lines 67 and 68. An indicating device 81 of the comparator may be calibrated to give a reading representing the moisture content of the web 30.

FIGURE 7 illustrates a further embodiment for sensing moisture content wherein a helical coil 100 of conductive wire 101 is wound on a rotatable dielectric core 102 which is journalled on bearings indicated diagrammatically at 105 and 106 by means of a hollow metallic shaft 108. Microwave energy is coupled to the coil 100 by means of a wave guide 110 and wave launcher 111 having a central coaxial conductor 113 coupled to end **101*a* of wire 101 by means of relatively rotatable capacitive coupling disks 117 and 118. The disk 118 rotates with shaft 108 and may be secured to flange 108*a* thereof by means of a suitable bracket of dielectric material. Wire 101 is led about a curved path as indicated at 101*b* by means of a plastic insert 125 in the shaft 108 which enables the microwave energy to be introduced along generally radially extending section 101*c* of wire 101 to the periphery of the core 102. A second plastic insert similar to that shown at 125 of specially selected dielectric constant may be provided at the juncture between the radially extending conductor portion 101*c* and the peripherally extending adjoining portion of the wire 101 forming part of coil 100. A web of paper as indicated at 130 may travel over the rotating assembly in contact with the successive turns of the coil 100. The web 130 may cause rotation of coil 100 and core 102 by virtue of its frictional engagement with coil 100**.

A pair of pickup probes 132 and 133 are indicated in FIGURE 7 which may be of the type illustrated in FIGURE 6*a* or FIGURE 6*b* and which are coupled to the microwave energy at spaced turns along the coil 100 to obtain a measure of the energy absorbed by the paper web 130 between the probes in the same manner as illustrated in FIGURE 6. The output from the probes 132 and 133 is indicated as being taken by means of electric leads 140, 141, 142 and 143 which extend into the interior of and along shaft 108, lead 140 joining lead 143 and connecting with a slip ring 150, while lead 141 is shown as connecting with a slip ring 151 and lead 142 is shown as connected to a ring 152. Brushes 153, 154 and 155 are illustrated as being in sliding conductive relation to the rings 150, 151 and 152 respectively, and the associated leads 157, 158 and 159 connect to the inputs of the comparator in the same manner as in FIGURE 6.

With respect to the embodiments of FIGURES 5, 6 and 7, it has been found that at certain critical frequencies in the microwave region, for example approximately 22,000 megacycles per second, the microwave energy transmitted along a wave guide may be relatively unaffected by the presence of a paper web while being critically sensitive to the moisture content of the web. The microwave source such as indicated at 35 in FIGURE 5 may deliver microwave energy to wave guide 37 in FIGURE 5 or 110 in FIGURE 7 at such resonance absorption frequency for water if it is desired to determine the moisture content of a paper web such as indicated at 30 in FIGURE 5 and 130 in FIGURE 7.

It will be observed that a portion of the periphery of the coil 32 in FIGURE 5 or 100 in FIGURE 7 is disposed in air, while another portion of the coil such as indicated at 32*a* in FIGURE 5 is in proximity to the web 30. With relatively thin webs in comparison to the wavelength of the microwave energy transmitted along the coil, no special provision may be necessary to prevent undue radiation of microwave energy at the portion of the coil contacting the paper web. In fact, the tendency of the microwave energy to be retarded at the region of impingement on the dielectric medium may amplify the effect of the presence of moisture in the paper web and provide a greater apparent power loss between probes 51 and 50 in FIGURE 6, for example.

If it is desired to compensate for the retarding effect on the wave energy of the presence of the web such as 30 in FIGURE 5 at region 32*a* of the coil 32, the region 32*a* of the coil may be provided with a larger radius of curvature than other portions of the coil so that the retarding effect of a dry paper web, for example, at the region 32*a* would provide a wave velocity related to the wave velocity at the inner side of the coil in dielectric medium 48 such as to prevent undue radiation from the coil at the region 32*a*. In FIGURE 7, the coil 100 is rotating so that it would not be convenient to provide a modified diameter in contact with the paper web.

Other methods of balancing wave velocity on respective sides of a conductor to prevent radiation from the conductor are disclosed in my copending application Ser. No. 710,766, filed Jan. 23, 1958 and entitled "Apparatus and Method for Measurement of Moisture Content."

The coils 32 and 100 are proportioned as described in connection with FIGURES 1 and 2 for example so as to provide reinforcement of the wave energy at successive turns of the coil at the excitation frequency. The comparator 80 may comprise a suitable ratio meter or bridge such as is commonly utilized to measure microwave standing wave ratios. An example of a suitable commercially available instrument is the Hewlett-Packard ratio meter model 416A.

Beyond the second probe 50 in FIGURE 6 and 133 in FIGURE 7, the portion of conductor 33 or 101 forming coil portion 32*b* in FIGURE 6 or 100*a* in FIGURE 7 should have higher resistance than the portion of conductor 33 defining the main section of coil 32 between probes 50 and 51 or coil 100 between probes 132 and 133 for absorbing the microwave energy and preventing reflection. An attenuator is indicated at 170 in FIGURE 5 for adjusting the level of microwave energy supplied to the coil 32 to an optimum level for the particular type of measurement involved and for isolating the source 35 from the sensing coil 32. Alternatively, in place of attenuator 170, a loop type attenuator similar to 32*b* may be provided on core 48 between open wire conductor portion 33*b* and the main portion of coil 32 between probes 50 and 51.

The dielectric mass indicated at 125 is so proportioned in relation to the dielectric such as air on the outer side of the curve 101*b* to cause the microwave energy to travel about the curve portion 101*b* without substantial loss as described in connection with FIGURES 1 and 2, for example.

FIGURE 8 illustrates the use of the coil type surface wave device in a magnetron-like apparatus. In this embodiment, a surface wave progresses between the successive coils indicated at 200–205 disposed about the central cathode indicated at 207. These coils are uniformly dispersed around the cathode, like the resonant cavities of a conventional magnetron, and, as with those cavities, their number depends on the microwave frequency to be generated. Alternatively some of the coils may be omitted from the regular arrangement to achieve spatial harmonic operation as described by R. G. Robertshaw and W. E. Willshaw, "Some Properties of Magnetrons Using Spatial Harmonic Operation," I.E.E. Monograph No. 168R. The coils are near to resonance at the operating frequency so as to act like the resonant cavities of a conventional magnetron. That, is the circumference of each coil is approximately a whole number of wavelengths as described in connection with FIGURES 1 and 2, but the total length of each coil should be a small fraction of a wavelength greater than a whole number of wavelengths so as to produce the necessary slowing of the wave which progresses around the cathode. (Unlike waves inside hollow waveguides, the velocity of surface waves on a single conductor surface wave line is very nearly the same as the velocity of free waves in the medium which surrounds the line.) The magnetic field is applied generally axially of the structure and normal to the plane of FIGURE 8 within the dash line indicated at 212 in FIGURE 8.

The coils 200–205 are formed by a single conductor 214 and together comprise the slow wave structure which may also serve as the anode of the magnetron, the electrons following generally spiral paths from the cathode 207 to the anode 214 as in conventional magnetron operation.

Power may be taken from the structure by means of a loop such as indicated diagrammatically at 220 resonant at the operating frequency, i.e., providing reinforcement at takeoff lead 220*a* as described in connection with FIGURE 1, and coupled to one of the coils such as coil 204 for delivering microwave power from the system along the conductor 220*a*.

As with conventional magnetrons, tuning may be accomplished by adjusting the anode to cathode D.C. potential differences or the strength of the magnetic field. The coils 200–205 may be tuned by making the dielectric cores as indicated at 225 tapered slightly and axially movable so that a small and variable spacing could exist between the core 225 and the associated loop such as 203. Alternatively, a porous dielectric may be provided whose effective dielectric constant can be varied by changing air pressure or by inserting different gases or liquids. Alternatively suitable quantities of dielectric material, which may be in tape form, may be adjustably placed close to the outside of the coils.

The whole configuration of coils 200–205 and conductor 214 as shown in FIGURE 8 may be repeated in stacked arrangement one above another with suitable spacing, about half wavelength or less, between successive layers and with the cathode 207 extending correspondingly. The successive layers may be formed by continuation of the same conductor or from separate conductors each closed on itself as indicated in FIGURE 8. This stacking will increase power capacity, or efficiency, or both.

For any given power output capacity, the device has advantage over conventional magnetrons in weight reduction owing to the use of wires or conductors of relatively small cross section in place of solid metal walls. Also, it is noted that instead of the conductor or conductors 214 being made to act as the anode as well as the slow wave structure of the magnetron, a separate anode structure may, with advantage, be provided outside the conductor 214. The electrons will then eventually go to this separate anode structure thus avoiding power dissipation problems in the slow wave structure. This separation of the anode from the slow wave structure is possible because of the relatively open structure of the latter as described above, which can thus act somewhat like a control grid. This separation is not possible in the conventional magnetron whose slow wave structure has solid metal walls.

Because the intensity of the electromagnetic field falls off only linearly with the distance from the conductor in single conductor surface wave transmission there is no difficulty in obtaining adequate interaction between the field travelling around the slow wave structure and the electrons originating at the cathode even at high spatial harmonic operation, that is, at a frequency $KN/2$ where K is an integer and N is the number of coils around the cathode. Thus the device is operable at higher frequencies than are conventional magnetrons.

FIGURE 9 illustrates a reflex klystron-like arrangement in which the anode comprises a conductive wire 250 in the form of a closed loop similar to that of FIGURE 1 but of elongated non-circular configuration which is resonant at the operating frequency of the device to provide a surface wave resonant storage circuit. Power may be taken from the anode loop 250 by means of the conductor portion indicated at **250*a*. Anode potential is furnished from power supply source 253 via electric line 254 and conductor 255 connecting with conductor portion 250*a*. A reflector disk is indicated at 257 which is adjusted in its distance from conductor 250*a* to give maximum reflection of microwave energy and minimum disturbance of the field on the surface wave conductor 250*a*. The disk 257 thus serves to isolate the microwave energy from the direct current supply line 254. In FIGURE 9, a cathode strip 260 and a reflector strip 262 of rectangular cross section are located within an evacuated envelope indicated at 265, and region 267 comprises the D.C. acceleration space of the device while region 268** constitutes the reflection space.

The anode loop 250 is preferably provided with means for minimizing radiation from the loop, for example by providing a pair of dielectric bars 275 and 276 at the interior surfaces of the curved ends of the loop so as to retard the velocity of the surface wave at the inner side of the curved ends to correspond to the effective velocity of the portion of the surface wave at the exterior of the curved ends. It will be noted that a negative potential is applied to the reflector strip 262 from voltage source 280 by means of electrical line 281. In place of the single anode loop 250, there may be several such closed resonant loops closely spaced so as to form a grid like structure between the cathode strip 260 and reflector 262. All such loops would be closely coupled together.

FIGURE 10 illustrates an embodiment similar to that of FIGURE 9 in which closed loops 300 and 301, which are resonant at the desired operating frequency, are connected by straight conductors 302 and **302*a*, the loops having cores 305 and 306 for minimizing radiation of microwave energy as the energy travels about the loops in accordance with the preceding embodiments. The remaining parts of the system of FIGURE 10 are similar to those in FIGURE 9 and corresponding primed reference numerals have been applied in FIGURE 10 to the similar parts. Microwave power may be taken from the device of FIGURE 10 by means of a coupling loop indicated diagrammatically in dash outline at 320 coupled to the loop 301** and having substantially the same resonant frequency and configuration.

As illustrated in FIGURE 11, in place of the single anode loops 300 and 301 of FIGURE 10, coils such as indicated at **300*a*, 300*b* and 301*a*, 301*b* may be provided in encircling relation to respective dielectric cores 325 and 326, the loops of the coils being closely coupled together and formed, together with the straight sections 302*b***, from a single continuous conductor as illustrated in FIGURE 11.

In the arrangements of FIGURES 9, 10 and 11 the loops or coils together with their joining straight conductor sections may be repeated in proximity to one another so that their straight conductor sections such as **302*a* in FIGURE 10 form a grid-like structure between the cathode and reflector electrodes such as 260′ and 262′**.

The methods of tuning the coils or loops in FIGURES 9, 10 and 11 may be as discussed in connection with the coils 200–205 in FIGURE 8. As with conventional klystrons, tuning may also be effected by adjustment of the negative voltage applied to the reflector 262 or 262′.

FIGURES 12, 13 and 14 illustrate an arrangement in accordance with the present invention for amplifying microwave signals. As seen in FIGURES 12 and 13, the apparatus may comprise a pair of spaced loop single conductor devices 400 and 401 enclosed within an evacuated envelope 404 which may be of transparent glass construction and which is illustrated relatively diagrammatically in FIGURES 12 and 13. It will be understood that the evacuated envelope 404 completely surrounds and encloses the loops **400*a* and 401*a* and is sealed about the tangential input line 400*b* and the tangential output line 401*b* of the respective loops. Microwave energy is introduced onto the lower single conductor loop 400*a* by means of the tangential input line 400*b*, and amplified microwave power is delivered from the system by means of the tangential output line 401*b* directly as a surface wave. Rings of dielectric material as indicated at 410 and 411 extend about the inner sides of the loops 400*a* and 401*a* as indicated in FIGURE 14 so as to confine a substantial portion of the microwave energy to the loop path and prevent radiation therefrom in the same manner as described in connection with the preceding embodiments. As indicated in FIGURE 14, loops 400*a* and 401*a* may be vertically aligned so that the loops 400*a* and 401*a*** have the same mean diameter.

The input loop **400*a* is provided with a thermoemissive coating 415 about its entire circumference, and the coating may be suitably heated as by means of heater wires 418 and 419 which may extend into the loop 400*a* through the interior of the input line 400*b* and extend entirely about the circumference of the loop 400*a* for substantially uniformly heating the thermoemissive surface 415 about the entire circumference of the loop. By way of example the wires 418 and 419 may be connected together at the end of the loop 400*a* indicated at 400*c* in FIGURE 12 so that heating current flows in one wire such as 418 through the input line 400*b* and around the loop to point 400*c* and then flows back in the reverse direction to the input line 400*b* along the other wire 419**.

In operation of the structure of FIGURES 12, 13 and 14, the anode loop **401*a* is maintained at a positive potential relative to the cathode loop 400*a*. The two loops 400*a* and 401*a* are closely spaced so as to be within each other's microwave fields so that microwave power will circulate in both loops in phase when a microwave signal is introduced at 400***b*. The electric vector between the loops resulting from the direct current potential therebetween is indicated by the long arrows such as 425 in FIGURE 13, while the electric field due to the microwave signal circulating in the respective loops 400*a* and 401*a* is indicated by the short arrows such as 426 and 427. As indicated, at some points about the loops at a given instant of time the direct current and microwave fields will aid each other as indicated for fields 425 and 426 and at other points the fields will oppose each other as indicated by vectors 425 and 427. At instants of time when the fields at a given point on the cathode loop 400*a* aid each other, the electrons emitted from the cathode loop will move rapidly toward the anode loop 401*a*, and if the potentials between the loops are right for the spacing therebetween and the frequency of the microwave signal, the electrons will arrive in the vicinity of the anode loop at the time when its field at the corresponding point has changed to aiding. This means that the transit time of such electrons from the cathode loop to the anode loop must equal an odd number of half cycles of the microwave signal frequency. In a similar manner electrons leaving the cathode loop at the same point but at an instant of time when the electric field such as indicated at 426 opposes the departure of the electrons, will move slower and, if the transit time to the anode loop equals an even number of half cycles of the microwave signal in this case, such electrons also will arrive in the vicinity of the anode loop at a time when the microwave field at the corresponding point is aiding. There will thus be a bunching of the electrons from the cathode so that the bunches arrive at the anode when the microwave field there is in aiding relation to the direct current field and the electron energy will thus add to the field energy, producing an amplifying or a regenerative system.

FIGURE 15 illustrates a modified form of loop structure for operation in the same manner as described in connection with FIGURES 12 to 14. In this case, cathode loop 450 and anode loop 451 together form a generally continuous spiral so that vertically adjacent portions of the two loops are substantially equally spaced and vertically aligned about the entire perimeter of the respective loops in the same manner as illustrated in FIGURES 12, 13 and 14. The cathode loop 450 is provided with a thermoemissive surface and interior heating wires in the same manner as illustrated in FIGURE 14, and a direct current potential is applied between the loops as in FIGURES 12–14. Microwave energy is introduced into the cathode loop by means of tangential input line 450*a* and is coupled to the anode loop 451 by means of coupling disks 454 and 455 which serve to isolate the loops with respect to the direct potential. As in the embodiment of FIGURES 12–14 an evacuated envelope is provided for the loops 450 and 451 and the input line 450*a* and output line 451*a* are sealed to the wall of the envelope so that the loops 450 and 451 are completely enclosed within the evacuated envelope. The operation of the embodiment of FIGURE 15 is substantially the same as FIGURES 12–14 and will be apparent from the foregoing description of the operation of the embodiment of FIGURES 12–14. The loops 450 and 451 will be provided with dielectric members at the radially inner side thereof for tending to equalize the radial velocity of the surface waves at the inner and outer sides of the loops in the same manner as previously described and as shown in FIGURE 14. The loops 450 and 451 may be closely coupled and dimensioned for reinforcement at corresponding points of the adjacent loops as in the preceding embodiments.

FIGURE 16 illustrates a further modification wherein an evacuated envelope 475 has a cathode loop 477 and an anode loop 478 substantially identical to those shown in FIGURE 12 and vertically aligned and having the dielectric rings at the inner sides as illustrated in FIGURE 14. In FIGURE 16, however, the loops 477 and 478 may be substantially spaced in comparison to the spacing between loops 400 and 401 in FIGURES 12–14. For controlling the delivery of microwave power to the anode loop 478, a grid loop 480 of substantially the same configuration as the anode loop 401 in FIGURE 12 is provided in vertical alignment with the cathode loop 477 and closely coupled thereto with respect to microwave energy circulating in the respective loops. The grid loop 480 is also provided with a dielectric ring such as indicated at 411 in FIGURE 14. By applying an input microwave signal to the tangential input grid line 480*a* of grid loop 480, electrons emitted from the cathode loop 477 may be bunched as described in connection with FIGURES 12–14 so as to generate an amplified microwave output signal in loop 478 for delivery from the device by tangential output line 478*a*. Cathode tangential line 477*a* may provide a means for introducing the heater wires corresponding to wires 418 and 419 in FIGURE 14 along the circumference of the cathode loop 477 and also as a means for introducing the potential between the loop 477 and the anode loop 478.

It will be appreciated that each of the embodiments of FIGURES 12 through 16 may be operated as an oscillator so as to generate microwave power by suitably coupling the input and output lines thereof.

A broad aspect of the present invention relates to the provision of a microwave device having means defining a loop single conductor surface wave path of predetermined electrical length for microwave energy of predetermined wavelength, and means for delivering microwave energy of said predetermined wavelength to said loop path. The loop path is preferably provided with means for equalizing the radial velocity of the wave at the inner and outer sides of curved portions of the path to reduce the radiation of microwave energy therefrom, so that a substantial portion of the entering microwave energy travels about the loop path.

In FIGURE 1, the loop path is provided by conductor 14 which has its end 14*a* electrically connected to the entering portion 14*b* of the loop path as by means of silver solder indicated at 13. The electrical length of the path is equal to an integral number of half wavelengths so that microwave energy of said wavelength delivered to conductor portion 14*c*, for example, will travel about the loop path and will be either in phase or 180° out of phase with respect to the energy at the entering portion 14*b* of the path. A resonant loop is provided where the length is an even number of half wavelengths and a nearly perfect reflector of microwave energy is provided by a loop having a length equal to an odd number of half wavelengths.

In FIGURE 2, the loop paths do not close, but are axially displaced to define a helix. The first loop path 15*a* may extend from point 15*d* to point 15*e*, and the second loop path 15*b*, may be provided by the portion of conductor 15 between points 15*e* and 15*f*. The successive loop paths have corresponding points such as 15*d* and 15*e* relatively closely spaced so that the energy associated with one loop is coupled to adjacent loops. For example, points 15*d* and 15*e* may be separated by less than a half wavelength. The electrical length of each loop path is preferably an integral number of half wavelengths to provide reinforcement or cancellation at corresponding points on the respective loop paths, such as points 15*d* and 15*e*. A microwave source is indicated at 340 in FIGURE 2 connected with coil 15 through a load 341.

FIGURES 5 through 7 illustrate microwave devices comprising a system having a sensing element such as 32 or 100 for coupling to a medium 30 or 130 to determine moisture content thereof, the sensing element comprising means defining a loop single conductor surface wave transmission path.

FIGURES 8 through 16 illustrate systems for generating or amplifying microwave energy utilizing resonant microwave energy storage circuits, the circuits comprising means defining a resonant loop microwave path such as loop 200 in FIGURE 8.

In each of the systems of FIGURES 8–16, the output microwave energy is available directly as a surface wave on an open wave guide. Thus any of the oscillators of FIGURES 8, 9, 10 and 11, for example, may be utilized for furnishing microwave energy to the devices of FIGURES 1 through 5 and 7, without the use of complicated wave guide-to-coaxial couplers and wave launchers such as shown at 38 and 39*a* in FIGURE 5.

The microwave source 340 in FIGURE 2 may thus comprise an oscillator such as shown in FIGURES 8 through 11 having its output open wave guide 220*a*, 250*a* or 320*a* connected directly to a single conductor surface wave transmission line such as indicated at 350 in FIGURE 2. The load 341 may correspond to the main section of coil 32 excluding attenuator 32*b*, in which case line 350 would lead directly to open conductor portion 33*b* in FIGURE 5 and line 22 in FIGURE 2 would be connected with the portion of conductor 33 just beyond pick-up probe 50 along a tangent to the coil 32 similar to the manner shown at 33*b* in FIGURE 5.

With respect to FIGURE 5, microwave source 35 may comprise any one of the oscillators of FIGURES 8, 9, 10 or 11, for example, so that an output line such as 220*a*, 250*a* or 320*a* may connect directly with line 22 of the fixed attenuator of FIGURE 2, while line 15*c* in FIGURE 2 would then connect with line 33*b* in FIGURE 5. The output of the oscillators of FIGURES 8 through 11 may be modulated by varying the direct current voltage between cathode 207 and anode 214 in FIGURE 8, and between cathode strip 260 or 260′ and reflector strip 262 or 262′ in FIGURE 9 or 10.

With respect to FIGURE 7, output lines 220*a*, 250*a* or 320*a* of the oscillators of FIGURES 8, 9 or 10 may terminate with a coupling disk such as shown at 117 in FIGURE 7, to couple surface wave energy to a disk such as 118 without the need of the coupling device 111.

The term "microwave" as used herein refers to electromagnetic wave energy having a wavelength of the order of or less than one-half meter.

The term "conductor" is used herein in a broad sense to include good conductors and semi-conductors but to exclude dielectrics, or non-conductors of electricity.

The term "single wire" transmission line is used herein to cover lines formed from a single elongated element, regardless of cross section, and is intended to comprehend elongated elements of either conductive or dielectric material.

The term "surface wave" as used herein refers to the manner of propagation of electromagnetic wave energy along an external surface of a transmission line.

What is claimed is:

1. A microwave device for operation at a predetermined microwave wavelength comprising:
   - a cathode,
   - a first surface wave path in the form of a plurality of closed loops interconnected with one another and spaced radially from said cathode and circumferentially around said cathode from one another,
   - means for applying a magnetic field to said surface wave path and substantially axially of said loops,
   - a second surface wave path in the form of a closed loop disposed adjacent one of the loops of said first surface wave path and in energy coupling relation thereto, the electrical length of each of said loops being substantially an integral number of wavelengths of said predetermined wavelength.

2. A microwave device as defined in claim 1 including a dielectric material secured to an inner surface of each of said loops and having a dielectric constant substantially equal to the quantity $$\left(1+\frac{\lambda}{4r}\right)^2$$

wherein λ is the predetermined microwave wavelength and $r$ is the radius of each loop.

3. A microwave device for operation at a predetermined microwave wavelength comprising:
   - a surface wave transmission conductor closed upon itself in the form of a first pair of semicircular sections joined together by straight sections tangential with respective ends of the semicircular sections,
   - a cathode disposed adjacent one of said straight sections,
   - a reflector positioned adjacent said one straight section and on an opposite side thereof from said cathode,
   - means for applying electrical potentials to said cathode and said reflector, and
   - an output surface wave path coupled to one of said semicircular sections, the electrical length of said conductor being an integral number of wavelengths of the predetermined wavelength.

4. A microwave device as defined in claim 3 including a dielectric material secured to an inner surface of said semicircular sections and having a dielectric constant equal to the quantity $$\left(1+\frac{\lambda}{4r}\right)^2$$

wherein λ is the predetermined microwave wavelength and $r$ is the radius of said semicircular sections.

5. A microwave device as defined in claim 3 including a plurality of said surface wave transmission conductors each being closed upon itself in the form of a first pair of semicircular sections joined together by straight sections tangential with respective ends of the semicircular sections, said plurality of conductors being disposed between said cathode and said reflector in spaced parallel relationship to one another.

6. A microwave device for operation at a predetermined microwave wavelength comprising:
   - a pair of surface wave paths in the form of a helix of constant radius from a longitudinal axis with longitudinally adjacent sections thereof of said paths disposed tangentially to one another, one end of each of said paths being tangentially aligned with one another,
   - a pair of coupling disks in spaced parallel relationship to one another each being connected to a respective one of said one ends of said paths,
   - means for connecting a microwave signal of said predetermined wavelength to the other end of one of said paths, and
   - means for withdrawing energy from the other end of the other of said paths, the electrical length of said paths being an integral number of wavelengths of said predetermined wavelength.

7. A microwave device as defined in claim 6 including a dielectric material secured to an inner surface of said paths and having a dielectric constant substantially equal to the quantity $$\left(1+\frac{\lambda}{4r}\right)^2$$

wherein λ is the predetermined microwave wavelength and $r$ is the radius of each of said paths.

8. A microwave device for operation at a predetermined microwave wavelength comprising:
   - a pair of single conductor surface wave coupling paths each in the form of a closed loop comprising respective elongated members, one of said members having a surface and having a thermoemissive material secured to said surface, and means for heating said thermoemissive material to cause electrons to be emitted therefrom for flow to the other of said elongated members for modifying the flow of microwave energy from the other of said members in operation of the device, means connecting a microwave signal of said predetermined microwave wavelength to one of said paths, means for withdrawing microwave energy from the other of said paths, said paths being parallel to one another, and the electrical length of each of said paths being an integral number of wavelengths of the predetermined wavelength.

References Cited

UNITED STATES PATENTS

| | | | |
|---|---|---|---|
| 2,673,900 | 3/1954 | Mumford | 179—171 |
| 2,704,829 | 3/1955 | Clay | 333—31 |
| 2,723,378 | 11/1955 | Clavier | 333—95 |
| 2,737,632 | 3/1956 | Grieg | 333—95 |
| 2,799,007 | 7/1957 | Kline | 333—31 |
| 2,810,887 | 10/1957 | Ecklund | 333—31 |
| 2,685,068 | 7/1954 | Goubau | 333—955 |
| 2,770,783 | 11/1956 | Clavier | 333—955 |
| 2,820,923 | 1/1958 | Wilbur | 315—39.3 |
| 2,863,092 | 12/1958 | Dench | 315—39.3 |
| 2,403,151 | 7/1946 | Roberts | 333—82 |
| 2,799,007 | 7/1957 | Kline | 333—95 |
| 1,978,021 | 10/1934 | Hollmann | 331—93 |
| 2,505,778 | 5/1950 | Limbach | 324—34 |
| 2,542,966 | 2/1951 | Randall et al. | 331—86 XR |
| 2,758,209 | 8/1956 | Lannan et al. | 333—82 |
| 2,840,752 | 6/1958 | Cutler et al. | 333—97 XR |
| 2,854,645 | 9/1958 | Arditi | 333—97 |
| 2,867,778 | 1/1959 | Hafner | 333—97 X |
| 2,946,970 | 7/1960 | Hafner | 333—95 |

FOREIGN PATENTS

| | | |
|---|---|---|
| 746,316 | 3/1956 | Great Britain. |
| 822,117 | 11/1951 | Germany. |

OTHER REFERENCES

"The Transdipper, A Developmental Transistor GDO" Radio and Television News, October 1953, pp. 60–62.

Proceedings of IEE, vol. 99, No. 57, January 1952, pp. 25–27.

GERARD R. STRECKER, Primary Examiner

P. F. WILLE, Assistant Examiner

U.S. Cl. X.R.

331—86; 333—97

UNITED STATES PATENT OFFICE

CERTIFICATE OF CORRECTION

Patent No. 3,491,291 Dated January 20, 1970

Inventor(s) CHARLES W. E. WALKER

It is certified that error appears in the above-identified patent and that said Letters Patent are hereby corrected as shown below:

Column 3, line 17, "forexample" should read --for example--;

line 18, "nd" should read --and--;

line 22, "form of a helical coil" should read --form of closed loop at 14 in Figure 1, shown in the fo of a helical coil--.

Signed and sealed this 2nd day of November 1971.

(SEAL)
Attest:

EDWARD M.FLETCHER,JR.
Attesting Officer

ROBERT GOTTSCHALK
Acting Commissioner of Patents

FORM PO-1050 (10-69)

USCOMM-DC 60376-P69
★ U.S. GOVERNMENT PRINTING OFFICE : 1969 O—366-334